(12) United States Patent
Rous et al.

(10) Patent No.: US 10,691,136 B2
(45) Date of Patent: Jun. 23, 2020

(54) METHOD AND DEVICE FOR PROVIDING A SIGNAL FOR OPERATING AT LEAST TWO VEHICLES

(71) Applicant: Robert Bosch GmbH, Stuttgart (DE)

(72) Inventors: Martin Rous, Mundelsheim (DE); Christian Wegend, Ditzingen (DE); Volker Hofsaess, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 224 days.

(21) Appl. No.: 16/002,340

(22) Filed: Jun. 7, 2018

(65) Prior Publication Data

US 2018/0356836 A1 Dec. 13, 2018

(30) Foreign Application Priority Data

Jun. 8, 2017 (DE) .................. 10 2017 209 666

(51) Int. Cl.
*G05D 1/02* (2020.01)
*G08G 1/00* (2006.01)
(Continued)

(52) U.S. Cl.
CPC ......... *G05D 1/0289* (2013.01); *G05D 1/0022* (2013.01); *G05D 1/0027* (2013.01);
(Continued)

(58) Field of Classification Search
CPC .... B60K 26/021; B60K 31/0008; B60K 6/28; B60K 6/365; B60K 6/445; F02N 11/0859; F02N 11/0866; F02N 11/04; F01N 3/10; F01N 11/002; B60W 10/06; B60W 30/16; B60W 50/082; B60W 10/08; B60W 10/26; B60W 20/00; B60W 20/10; B60W 30/143; B60W 10/18; B60W 10/04; B60W 10/20; B60W 50/10; A01D 34/80; A01D 34/828; G05D 1/0289; G05D 1/0293; G05D 1/0088; G05D 1/0022; G05D 1/0027; B60L 3/003; B60L 3/0046; B60L 50/61; B60L 50/16; B60L 58/21; F02D 31/002; F02D 31/007; F02D 41/221; F02D 41/123;
(Continued)

(56) References Cited

U.S. PATENT DOCUMENTS

2001/0048226 A1* 12/2001 Nada .................. F02N 11/0859
290/40 C
2003/0163240 A1* 8/2003 Egami .................. B60K 26/021
701/96

(Continued)

FOREIGN PATENT DOCUMENTS

DE 10101652 A1 7/2002

*Primary Examiner* — Behrang Badii
(74) *Attorney, Agent, or Firm* — Norton Rose Fulbright US LLP; Gerard Messina

(57) ABSTRACT

A method and device for providing a signal for operating at least two vehicles including: receiving vehicle data values which represent at least one further vehicle, the at least one further vehicle cutting in between the at least two vehicles, acquiring a first driving strategy of the at least two vehicles, determining a second driving strategy for the at least two vehicles, as a function of the first driving strategy and as a function of the vehicle data values, and providing a signal for operating the at least two vehicles as a function of the second driving strategy.

10 Claims, 4 Drawing Sheets

(51) Int. Cl.
*G08G 1/16* (2006.01)
*G05D 1/00* (2006.01)
*B60K 31/00* (2006.01)
*B60K 26/02* (2006.01)
*B60K 31/18* (2006.01)

(52) U.S. Cl.
CPC ............ *G08G 1/164* (2013.01); *G08G 1/166* (2013.01); *G08G 1/22* (2013.01); *B60K 26/021* (2013.01); *B60K 31/00* (2013.01); *B60K 31/0008* (2013.01); *B60K 31/18* (2013.01)

(58) Field of Classification Search
CPC .... F02D 41/1495; F02D 41/222; F02D 29/02; G08G 1/167; G08G 1/202; G08G 1/166; G08G 1/22; G08G 1/164; G01S 5/0294; G01S 13/931; G01S 19/07; B60N 2/797; G01C 21/3658
See application file for complete search history.

(56) References Cited

U.S. PATENT DOCUMENTS

| | | | |
|---|---|---|---|
| 2006/0089232 A1* | 4/2006 | Kobayashi | B60K 6/48 477/70 |
| 2011/0301796 A1* | 12/2011 | Ohashi | B60K 6/387 701/22 |
| 2014/0020363 A1* | 1/2014 | Sasaki | F01N 3/10 60/274 |
| 2015/0224991 A1* | 8/2015 | Sudou | B60W 10/06 701/96 |
| 2015/0232094 A1* | 8/2015 | Sudou | B60W 30/143 701/93 |

* cited by examiner

METHOD AND DEVICE FOR PROVIDING A SIGNAL FOR OPERATING AT LEAST TWO VEHICLES

RELATED APPLICATION INFORMATION

The present application claims priority to and the benefit of German patent application no. 10 2017 209 666.7, which was filed in Germany on Jun. 8, 2017, the disclosure which is incorporated herein by reference.

FIELD OF THE INVENTION

The present invention relates to a method and a device for providing a signal for operating at least two vehicles including a step of receiving vehicle data values, a step of acquiring a first driving strategy of the at least two vehicles, a step of determining a second driving strategy for the at least two vehicles, and a step of providing a signal for operating the at least two vehicles.

SUMMARY OF THE INVENTION

The method according to the present invention for providing a signal for operating at least two vehicles includes a step of receiving vehicle data values, which represent at least one further vehicle, the at least one further vehicle cutting in between the at least two vehicles, and a step of acquiring a first driving strategy of the at least two vehicles. The method furthermore includes a step of determining a second driving strategy for the at least two vehicles, as a function of the first driving strategy and as a function of the vehicle data values, and a step of providing a signal for operating the at least two vehicles, as a function of the second driving strategy.

A driving strategy of the at least two vehicles is to be understood, for example, as a specification which includes a specified minimum and/or maximum distance between the at least two vehicles. Furthermore, the specification additionally or alternatively includes a specified minimum and/or maximum speed for the at least two vehicles.

Furthermore, the driving strategy for each of the at least two vehicles may include a separate speed and/or distance specification—in relation to the vehicle traveling ahead and/or traveling behind—for example, as a function of the at least one further vehicle. Furthermore, the specification additionally or alternatively includes an arrangement specification, which establishes a sequence of the at least two vehicles, for example. Furthermore, the specification may alternatively include the resolution of a shared driving strategy, each of the at least two vehicles being assigned, for example, a separate speed and/or distance specification. Furthermore, the acquisition of the first and/or second driving strategy alternatively and/or additionally includes at least one position, for example, with the aid of GPS coordinates, of at least one vehicle of the at least two vehicles.

The method according to the present invention has the advantage that not only the first driving strategy of the at least two vehicles or only the at least one further vehicle is acquired, but rather an interplay of both influences. This increases the level of safety when operating the at least two vehicles in the form of a second driving strategy, which is thus optimally adapted to the at least two vehicles, for example, with the aid of an adaptation of a speed and/or a distance between the at least two vehicles.

The vehicle data values may be acquired with the aid of a surroundings sensor system, which is encompassed by at least one of the at least two vehicles.

A surroundings sensor system is to be understood as at least one sensor, for example, a camera and/or a radar sensor and/or a LIDAR sensor and/or an ultrasonic sensor and/or any other sensor which is configured to detect the surroundings of the at least two vehicles in the form of at least one further vehicle.

The advantage is shown herein that the relevant surroundings of the at least two vehicles are always detected in a very up-to-date manner with the aid of the surroundings sensor system.

The vehicle data values may be acquired in such a way that the vehicle data values represent the at least one further vehicle in such a way that operation of the at least two vehicles according to the first driving strategy is not possible according to specified criteria.

The specified criteria include, for example, a legally prescribed minimum and/or maximum speed and/or a legally prescribed minimum and/or maximum distance and/or a minimum and/or maximum distance or a minimum and/or maximum speed which are a function of technical features, for example, the maximum braking deceleration of at least one of the at least two vehicles. The fact that an operation of the at least two vehicles according to the first driving strategy is not possible means, for example, that at least one distance between at least one of the at least two vehicles and the at least one further vehicle is less than a minimum distance according to one of the specified criteria.

The advantage is shown herein that the specified criteria which are relevant, for example, for safe operation of the at least two vehicles are taken into consideration and the level of safety is elevated by adapting the first driving strategy in the form of a second driving strategy.

The determination of the second driving strategy and the provision of the signal may take place in such a way that the at least two vehicles and the at least one further vehicle are operated as a function of the second driving strategy.

The advantage is shown herein that the second driving strategy takes into consideration all vehicles participating in the method, whereby the operation of these vehicles becomes safer as a result of a shared second driving strategy, since, for example, unforeseen maneuvers—in particular of the at least one further vehicle—are avoided. Furthermore, it is advantageous that as a result of the shared second driving strategy, the at least one further vehicle is taken into consideration and an adaptation of the speed and/or the distance between the vehicles is adapted in such a way that, for example, all vehicles are operated more energy efficiently than if not all vehicles were involved.

The second driving strategy may provide a data exchange between at least one of the at least two vehicles and the at least one further vehicle.

A data exchange is to be understood, for example, as a transmission of the first and/or second driving strategy in the form of data values between the vehicles.

Furthermore, the data exchange includes, for example, a piece of information to the at least one further vehicle, originating from at least one of the at least two vehicles, which notifies an operator of the at least one further vehicle that the at least two vehicles are operated according to a first driving strategy, which may no longer be pursued as a result of the cutting in of the at least one further vehicle between the at least two vehicles.

The advantage is shown herein that as a result of the data exchange—in particular safety-relevant—pieces of information are exchanged, whereby the operation of the at least two vehicles—in particular with the aid of the second driving strategy—and/or the operation of the at least one further vehicle is enhanced.

The first driving strategy and/or the second driving strategy may include a shared trajectory, along which the at least two vehicles and/or the at least one further vehicle are operated, and/or a distance specification between the at least two vehicles and/or the at least one further vehicle and/or a speed specification for the at least two vehicles and/or the at least one further vehicle and/or a lane specification for the at least two vehicles and/or the at least one further vehicle.

A trajectory—in particular a shared trajectory—is to be understood, for example, as a general specification of how the at least two vehicles and/or the at least one further vehicle move from a starting point to an end point according to a navigation with the aid of a navigation system, and/or a high-precision specification in the form of a high-precision orientation, for example, the exact lane in a multilane roadway.

In one particular specific embodiment, the provision of the signal for operating the at least two vehicles takes place in such a way that the at least two vehicles and/or the at least one further vehicle are operated as a function of the second driving strategy, as long as it is detected that the at least one further vehicle is located between the at least two vehicles, and the at least two vehicles are operated as a function of the first driving strategy if the at least one further vehicle cuts out again from between the at least two vehicles.

The first device according to the present invention for providing a signal for operating at least two vehicles includes first arrangement for receiving vehicle data values which represent at least one further vehicle, the at least one further vehicle cutting in between the at least two vehicles, and second arrangement for acquiring a first driving strategy of the at least two vehicles. The first device furthermore includes third arrangement for determining a second driving strategy for the at least two vehicles, as a function of the first driving strategy and as a function of the vehicle data values, and fourth arrangement for providing a signal for operating the at least two vehicles, as a function of the second driving strategy.

The first arrangement and/or the second arrangement and/or the third arrangement and/or the fourth arrangement may be configured for the purpose of carrying out a method according to at least one of the method claims.

The second device according to the present invention for operating a vehicle includes transmitting and receiving arrangement for receiving a signal for operating the vehicle, the signal being provided according to a method as recited in at least one of the methods described herein, and a vehicle arrangement for operating the vehicle as a function of the received signal.

Advantageous refinements of the present invention are indicated in the further descriptions herein and described in the description.

Exemplary embodiments of the present invention are shown in the drawings and will be explained in greater detail in the following descriptions.

DETAILED DESCRIPTION

Figure 1:
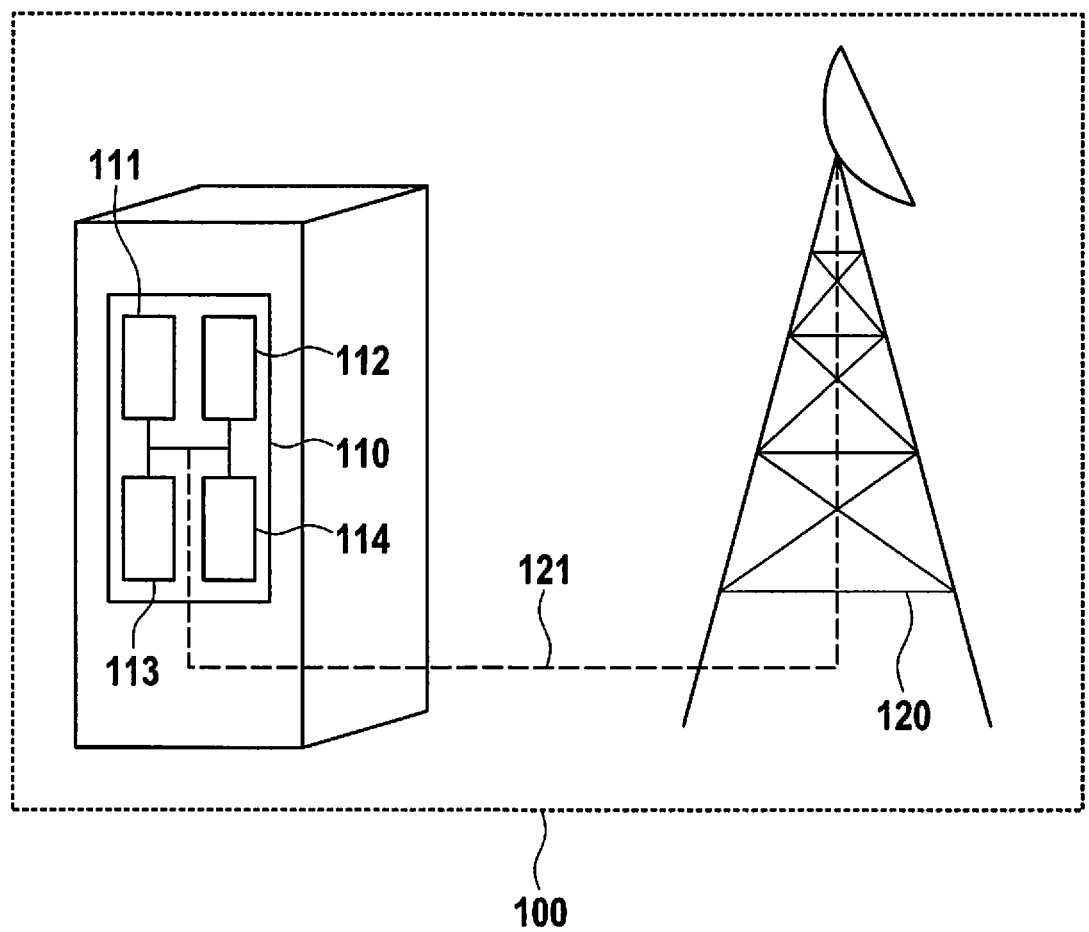
FIG. 1 shows, solely by way of example, an exemplary embodiment of the first device according to the present invention.

FIG. 1 shows a processing unit 100—illustrated by way of example—which includes a first device 110 for providing a signal for operating at least two vehicles 310, 320. A processing unit 100 is to be understood, for example, as a server. In another specific embodiment, a processing unit 100 is to be understood as a cloud—i.e., a composite of at least two electrical data processing systems—which exchange data with the aid of the Internet, for example. In another specific embodiment, processing unit 100 corresponds to first device 110. In another specific embodiment, device 110 is situated in one of the at least two vehicles 310, 320.

First device 110 includes first arrangement 111 for receiving 410 vehicle data values, which represent at least one further vehicle 330, the at least one further vehicle 330 cutting in between the at least two vehicles 310, 320, and second arrangement 112 for acquiring 420 a first driving strategy of the at least two vehicles 310, 320. First device 110 furthermore includes third arrangement 113 for determining 430 a second driving strategy for the at least two vehicles 310, 320, as a function of the first strategy and as a function of the vehicle data values, and fourth arrangement 114 for providing 440 a signal for operating the at least two vehicles 310, 320, as a function of the second driving strategy.

First arrangement 111 and/or second arrangement 112 and/or third arrangement 113 and/or fourth arrangement 114 may be configured differently—depending on the particular specific embodiment of processing unit 100. If processing unit 100 is configured as a server, first arrangement 111 and/or second arrangement 112 and/or third arrangement 113 and/or fourth arrangement 114 are located at the same location—in relation to the position of first device 110.

If processing unit 100 is configured as a cloud, first arrangement 111 and/or second arrangement 112 and/or third arrangement 113 and/or fourth arrangement 114 may be located at different locations, for example, in different cities and/or in different countries, a connection—for example, the Internet—being configured for exchanging (electronic) data between first arrangement 111 and/or second arrangement 112 and/or third arrangement 113 and/or fourth arrangement 114.

First arrangement 111 are configured to receive vehicle data values. First arrangement 111 include a receiving and/or transmitting unit, with the aid of which data are requested and/or received. In another specific embodiment, first arrangement 111 are configured in such a way that they are connected to an externally situated transmitting and/or receiving unit 122—proceeding from first device 110—with the aid of a wired and/or wireless connection 121. Furthermore, first arrangement 111 include electronic data processing elements, for example, a processor, main memory, and a hard drive, which are configured to process the received vehicle data values, for example, to carry out a modification and/or adaptation of the data format, and subsequently relay them to third arrangement 113. In another specific embodiment, first arrangement 111 are configured so as to relay the received vehicle data values—without data processing elements—to third arrangement 113.

First arrangement 111 are furthermore configured to receive at least one position of the at least two vehicles 310, 320 with the aid of the transmitting and/or receiving unit.

Furthermore, the first device includes a second arrangement 112, which are configured to acquire a first driving strategy of the at least two vehicles 310, 320 (in the form of data values). If the first driving strategy is requested from an external processing unit, the specific embodiment of second arrangement 112 corresponds, for example, to a specific embodiment of first arrangement 111.

In another specific embodiment of first device 110, first arrangement 111 and second arrangement 112 are identical, i.e., are configured to receive the first vehicle data values and the first driving strategy in the form of data values.

In another specific embodiment of first device 110, second arrangement 112 are configured so as to acquire the first driving strategy by reading out the first driving strategy from a memory, in which it was previously stored.

Furthermore, first device 110 includes third arrangement 113 for determining 440 a second driving strategy, as a function of the first driving strategy and as a function of the vehicle data values. For this purpose, third arrangement 113 include electronic data processing elements, for example, a processor, main memory, and a hard drive. Furthermore, third arrangement 113 include corresponding software, which is configured to determine a second driving strategy in accordance with method 400 according to the present invention from the vehicle data values received with the aid of first arrangement 111 and/or from the first driving strategy acquired with the aid of second arrangement 112.

Furthermore, first device 110 includes fourth arrangement 114 for providing a signal. For this purpose, fourth arrangement 114 include a transmitting and/or receiving unit, with the aid of which data are requested and/or received. In another specific embodiment, fourth arrangement 114 are configured in such a way that—proceeding from first device 110—they are connected to an externally situated transmitting and/or receiving unit 122 with the aid of a wired and/or wireless connection 121. In another specific embodiment, the transmitting and/or receiving arrangement is identical to the transmitting and/or receiving arrangement of first arrangement 111 and/or second arrangement 112 (if they are configured—depending on the specific embodiment—as a transmitting and/or receiving unit).

Furthermore, fourth arrangement 114 include electronic data processing elements, for example, a processor, main memory, and a hard drive, which are configured to process the determined data, for example, to carry out a modification and/or adaptation of the data format, and subsequently to provide them as a signal.

The signal is provided, for example, as a function of the determined data values in such a way that it includes modifications of the first driving strategy into a second driving strategy for the at least two vehicles 310, 320, a driving strategy including, for example, a specification according to the above-described examples.

Figure 2:
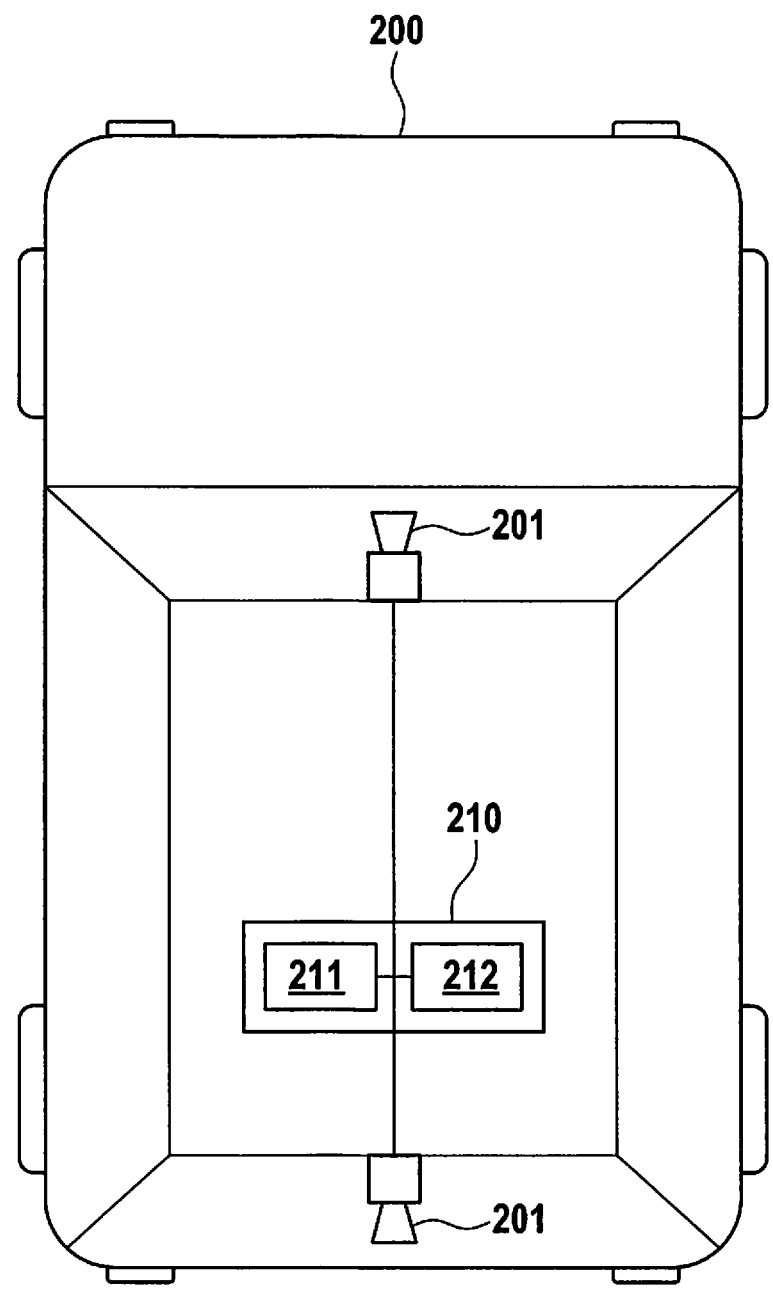
FIG. 2 shows, solely by way of example, an exemplary embodiment of the second device according to the present invention.

FIG. 2 shows a vehicle 200, which includes a second device 210 for operating vehicle 200. Vehicle 200 is configured in this case as a passenger automobile. In further specific embodiments, the vehicle 200 is configured in particular as a truck or as a two-wheeled vehicle.

Second device 210 includes transmitting and receiving arrangement 211 for receiving a signal for operating vehicle 200 and vehicle arrangement 212 for operating vehicle 200.

Transmitting and receiving arrangement 211 is configured to receive a signal. For this purpose, transmitting and receiving arrangement 211 include a receiving and/or transmitting unit, with the aid of which signals are requested and/or received. In another specific embodiment, receiving arrangement 211 is configured in such a way that—proceeding from second device 210—they are connected to an externally situated transmitting and/or receiving unit with the aid of a wired and/or wireless connection. This may be a navigation system, for example, which is encompassed by vehicle 200.

In another specific embodiment, transmitting and receiving arrangement 211 are configured in such a way that they are connected to a mobile receiving device—in particular a smart phone. This connection may be carried out, for example, with the aid of a wired and/or wireless connection, for example, Bluetooth.

Furthermore, transmitting and receiving arrangement 211 are configured so as to relay the received signal to vehicle arrangement 212. In another specific embodiment, transmitting and receiving arrangement 211 include electronic data processing elements, for example, a processor, main memory, and a hard drive, which are configured to process the received signal, for example, to carry out a modification and/or adaptation of the data format, and subsequently relay it to vehicle arrangement 212.

Furthermore, vehicle 200 includes at least one sensor 201, which is configured to detect at least one further vehicle 330, the at least one further vehicle 330 cutting in between the at least two vehicles 310, 320, in the form of vehicle data values. The at least one sensor may be configured, for example, as a video and/or radar and/or ultrasonic and/or LIDAR sensor and/or as a further sensor type—which is suitable for detecting the at least one further vehicle 330.

The acquired vehicle data values which are acquired with the aid of the at least one sensor 201 may be transmitted with the aid of transmitting and receiving arrangement 211 to an external processing unit.

Furthermore, second device 210 includes vehicle arrangement 212 for operating vehicle 200. For this purpose, vehicle arrangement 212 are configured, for example, so as to relay the signal received with the aid of transmitting and receiving arrangement 211 to a control unit of vehicle 200. In another specific embodiment, vehicle arrangement 212 are configured for influencing—as a function of the signal—vehicle 200. This may include, for example, the display of the signal with the aid of a display suitable for this purpose in vehicle 200. Furthermore, proceeding from the signal, an influence may take place on the driving characteristics of vehicle 200, for example, in the form of a direction change and/or a speed change.

Figure 3:
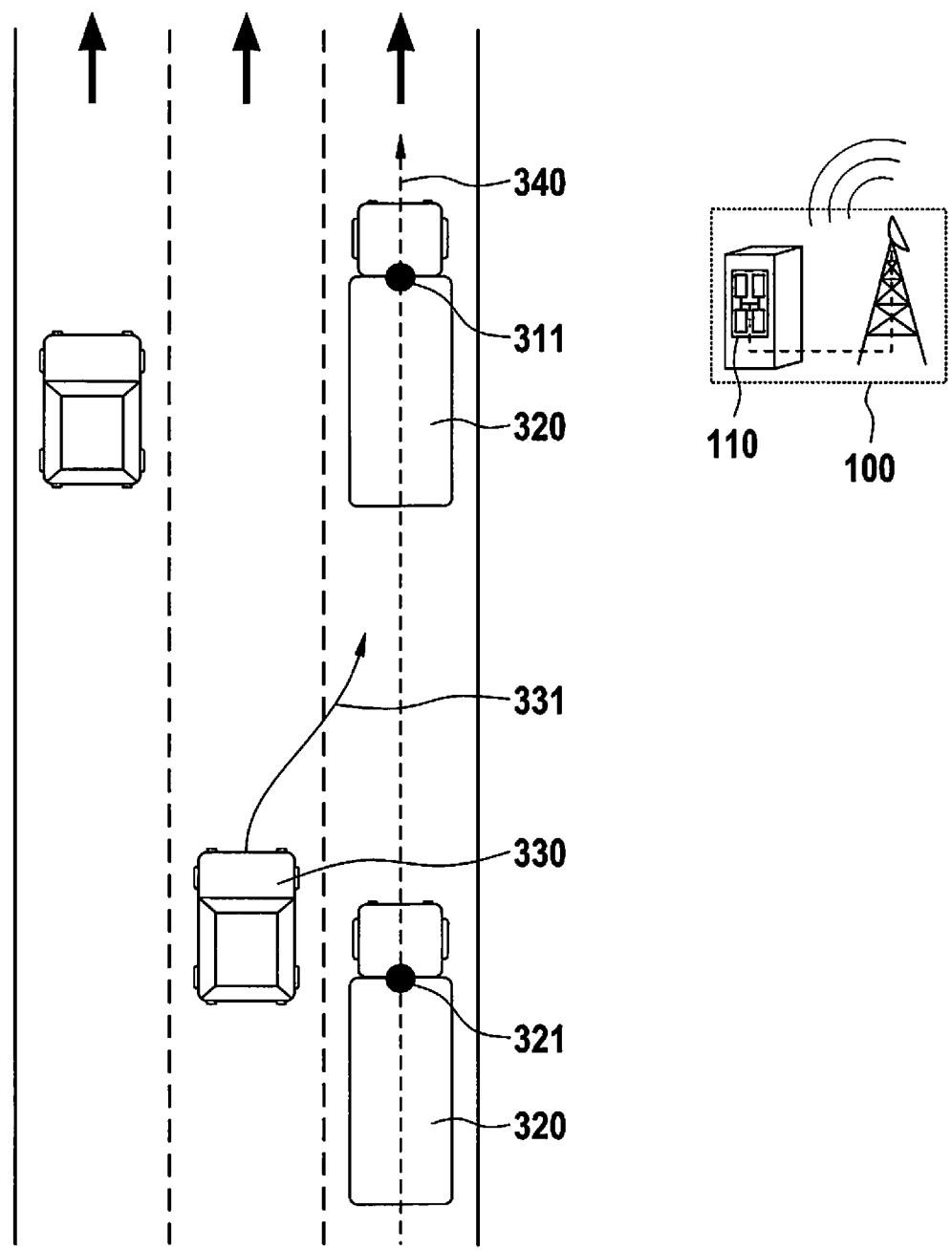
FIG. 3 shows, solely by way of example, an exemplary embodiment of the method according to the present invention.

FIG. 3 shows an exemplary embodiment of method 400 according to the present invention. The at least two vehicles 310, 320 are configured by way of example as trucks. The at least two vehicles 310, 320 are located in this case on a three-lane road, all three lanes being traveled in the same direction.

Furthermore, at least one further vehicle 330 is located on this road, which is configured here by way of example as a passenger automobile. The at least one further vehicle 330 cuts in between the at least two vehicles 310, 320, which is shown here in the illustration by a cutting-in trajectory 331.

The fact that the at least one further vehicle 330 cuts in between the at least two vehicles 310, 320 is detected, for example, with the aid of a surroundings sensor system 311, 321, which is encompassed by one of the at least two vehicles 310, 320, in the form of vehicle data values and transmitted with the aid of a transmitting and/or receiving device suitable for this purpose to first device 110, which is configured as a server 100, for example, and received by first arrangement 111 of first device 110.

Furthermore, a first driving strategy of the at least two vehicles 310, 320 is acquired, it being read out, for example, from a memory of first arrangement 111 and/or second arrangement 112 and/or third arrangement 113 and/or fourth arrangement 114. The first driving strategy was also determined beforehand, for example, with the aid of first device 110, transmitted to the at least two vehicles 310, 320, and moreover stored in this memory.

A second driving strategy for the at least two vehicles 310, 320 is determined with the aid of third arrangement 113 as a function of the first driving strategy and as a function of the vehicle data values, and a signal for operating the at least two vehicles 310, 320 is provided as a function of the second driving strategy.

In another specific embodiment, determination 430 of the second driving strategy and provision 440 of the signal take place, for example, in such a way that the at least two vehicles 310, 320 and the at least one further vehicle 330 are operated as a function of the second driving strategy.

The second driving strategy includes, for example, a shared trajectory 340, along which the at least two vehicles 310, 320 and/or the at least one further vehicle 330 are operated, and/or a distance specification between the at least two vehicles 310, 320 and/or the at least one further vehicle 330 and/or a speed specification for the at least two vehicles 310, 320 and/or the at least one further vehicle 330 and/or a lane specification for the at least two vehicles 310, 320 and/or the at least one further vehicle 330.

In one specific embodiment, the second driving strategy provides, for example, a data exchange between at least one of the at least two vehicles 310, 320 and the at least one further vehicle 330. For example, the signal for operation is provided in such a way that the signal may only be received by the at least two vehicles 310, 320, the signal nonetheless still being transmitted to the at least one further vehicle 330 with the aid of other suitable connection options—so-called Car2Car connections.

In another specific embodiment, provision 440 of the signal for operating the at least two vehicles 310, 320 takes place in such a way, for example, that the at least two vehicles 310, 320 and/or the at least one further vehicle 330 are operated as a function of the second driving strategy as long as it is detected that the at least one further vehicle 330 is located between the at least two vehicles 310, 320. The at least two vehicles 310, 320—as shown here by way of example—are located, for example, on the right of three lanes and the at least one further vehicle 330 intends to cut in only temporarily between the at least two vehicles 310, 320 to leave the road shown here shortly thereafter with the aid of an exit. The second driving strategy includes, for example, the at least two vehicles temporarily increasing their distance and/or the rear of the at least two vehicles 320 reducing its speed, for example. The at least two vehicles 310, 320 are then operated as a function of the first driving strategy when the at least one further vehicle 330 between the at least two vehicles 310, 320 cuts out again.

Figure 4:
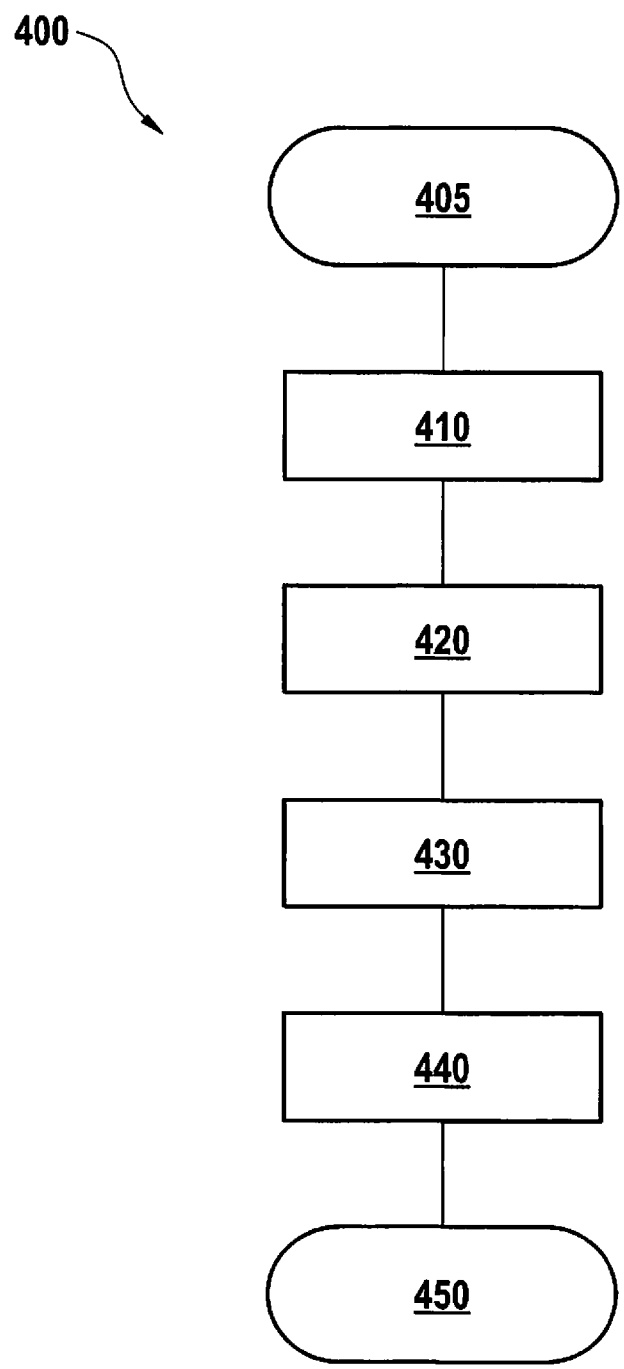
FIG. 4 shows, solely by way of example, an exemplary embodiment of the method according to the present invention in the form of a flow chart.

FIG. 4 shows an exemplary embodiment of a method 400 for providing a signal for operating at least two vehicles 310, 320.

In step 405, method 400 starts.

In step 410, vehicle data values which represent at least one further vehicle 330 are received, the at least one further vehicle 330 cutting in between the at least two vehicles 310, 320.

In step 420, a first driving strategy of the at least two vehicles 310, 320 is acquired.

In step 430, a second driving strategy for the at least two vehicles 310, 320 is determined as a function of the first driving strategy and as a function of the vehicle data values.

In step 440, a signal is provided for operating the at least two vehicles 310, 320, as a function of the second driving strategy.

In step 450, method 400 ends.

What is claimed is:

1. A method for providing a signal for operating at least two vehicles, the method comprising:
   receiving vehicle data values, which represent at least one further vehicle, the at least one further vehicle cutting in between the at least two vehicles;
   acquiring a first driving strategy of the at least two vehicles;
   determining a second driving strategy for the at least two vehicles, as a function of the first driving strategy and as a function of the vehicle data values; and
   providing a signal for operating the at least two vehicles, as a function of the second driving strategy.

2. The method of claim 1, wherein the vehicle data values are acquired with a surroundings sensor system, which is encompassed by one of the at least two vehicles.

3. The method of claim 2, wherein the vehicle data values are acquired so that the vehicle data values represent the at least one further vehicle so that an operation of the at least two vehicles according to the first driving strategy is not possible according to predefined criteria.

4. The method of claim 1, wherein the determination of the second driving strategy and the providing of the signal occur so that the at least two vehicles and the at least one further vehicle are operated as a function of the second driving strategy.

5. The method of claim 4, wherein the second driving strategy provides a data exchange between at least one of the at least two vehicles and the at least one further vehicle.

6. The method of claim 1, wherein the first driving strategy and/or the second driving strategy include a shared trajectory, along which the at least two vehicles and/or the at least one further vehicle are operated, and/or for which there is a distance specification between the at least two vehicles and/or the at least one further vehicle, and/or for which there is a speed specification for the at least two vehicles and/or the at least one further vehicle, and/or for which there is a lane specification for the at least two vehicles and/or the at least one further vehicle.

7. The method of claim 1, wherein the providing of the signal for operating the at least two vehicles occurs so that the at least two vehicles and/or the at least one further vehicle are operated as a function of the second driving strategy as long as it is detected that the at least one further vehicle is located between the at least two vehicles, and the at least two vehicles are operated as a function of the first driving strategy, when the at least one further vehicle between the at least two vehicles cuts out again.

8. A first device for providing a signal for operating at least two vehicles, comprising:
   a first arrangement for receiving vehicle data values, which represent at least one further vehicle, the at least one further vehicle cutting in between the at least two vehicles;

a second arrangement for acquiring a first driving strategy of the at least two vehicles;

a third arrangement for determining a second driving strategy for the at least two vehicles, as a function of the first driving strategy and as a function of the vehicle data values; and a fourth arrangement for providing a signal for operating the at least two vehicles, as a function of the second driving strategy.

9. The first device of claim 8, wherein at least one of the first arrangement, the second arrangement, the third arrangement, and the fourth arrangement is configured for providing a signal for operating at least two vehicles, by performing the following:

receiving the vehicle data values, which represent the at least one further vehicle, the at least one further vehicle cutting in between the at least two vehicles;

acquiring the first driving strategy of the at least two vehicles;

determining the second driving strategy for the at least two vehicles, as a function of the first driving strategy and as a function of the vehicle data values; and providing a signal for operating the at least two vehicles, as a function of the second driving strategy.

10. A second device for operating a vehicle, comprising:

a transmitting and receiving arrangement for receiving a signal for operating the vehicle, the signal being provided for operating at least two vehicles, the signal being obtained by performing the following:

receiving the vehicle data values, which represent the at least one further vehicle, the at least one further vehicle cutting in between the at least two vehicles;

acquiring the first driving strategy of the at least two vehicles;

determining the second driving strategy for the at least two vehicles, as a function of the first driving strategy and as a function of the vehicle data values; and providing a signal for operating the at least two vehicles, as a function of the second driving strategy; and a vehicle arrangement for operating the vehicle, as a function of the received signal.

* * * * *